(12) United States Patent
Buettiker et al.

(10) Patent No.: US 8,066,457 B2
(45) Date of Patent: Nov. 29, 2011

(54) MACHINE TOOL

(75) Inventors: Otto Buettiker, Gunzgen (CH); Roman Eigenmann, Oftringen (CH); Jacek Kruszynski, Stuttgart (DE)

(73) Assignee: Komet Group GmbH, Besigheim (DE)

( * ) Notice: Subject to any disclaimer, the term of this patent is extended or adjusted under 35 U.S.C. 154(b) by 967 days.

(21) Appl. No.: 11/988,120

(22) PCT Filed: May 26, 2006

(86) PCT No.: PCT/EP2006/005042
§ 371 (c)(1),
(2), (4) Date: Dec. 28, 2007

(87) PCT Pub. No.: WO2007/003248
PCT Pub. Date: Jan. 11, 2007

(65) Prior Publication Data
US 2009/0123244 A1    May 14, 2009

(30) Foreign Application Priority Data
Jul. 5, 2005 (DE) .......................... 10 2005 031 683

(51) Int. Cl.
*B23B 51/00* (2006.01)
(52) U.S. Cl. ................ 409/234; 279/8; 279/20; 408/59; 408/227; 408/233
(58) Field of Classification Search .................. 409/234, 409/232, 136; 408/57, 59, 200–201, 227, 408/231–233, 713; 279/8, 20
See application file for complete search history.

(56) References Cited

U.S. PATENT DOCUMENTS
1,357,042 A * 10/1920 Gairing .......................... 408/201
(Continued)

FOREIGN PATENT DOCUMENTS
DE    40 15 514 A1    12/1990
(Continued)

OTHER PUBLICATIONS

German Patent Office Search Report dated Dec. 12, 2007 (4 pages).
International Search Report dated Aug. 31, 2006 (4 pages).
Notification ot Transmittal ot International Preliminary Exam Report dated Sep. 25, 2007 (1 page).
International Preliminary Exam Report dated Sep. 25, 2007 (10 pages).

*Primary Examiner* — Daniel Howell
(74) *Attorney, Agent, or Firm* — Flynn, Thiel, Boutell & Tanis, P.C.

(57) ABSTRACT

The invention relates to a machine tool, particularly a machine reamer, comprising a shaft-type base and a replaceable cutter head which frontally protrudes from the base. An axially protruding extension of said cutter head engages into a frontal receptacle that is fixed to the base, the cutter head being removably clamped in said receptacle by means of a clamping screw which penetrates the replaceable cutter head in a truly axial direction. The screw head of the clamping screw rests against a face of the replaceable cutter head. The extension of the replaceable cutter head is provided with a polygonal part which is complementary to a truly axial polygonal hole that is fixed to the base and is penetrated by the polygonal part. The extension is further provided with an externally conical part which adjoins the polygonal part, engages into a conical hole that is fixed to the base, and is complementary to said conical hole while the clamping screw is screwed into a central internal thread that is fixed to the base. Preferably, the base is equipped with a functional insert which is rigidly connected to the base and contains the internal thread, the polygonal hole, and/or the conical hole.

24 Claims, 10 Drawing Sheets

U.S. PATENT DOCUMENTS

Figure 1A:
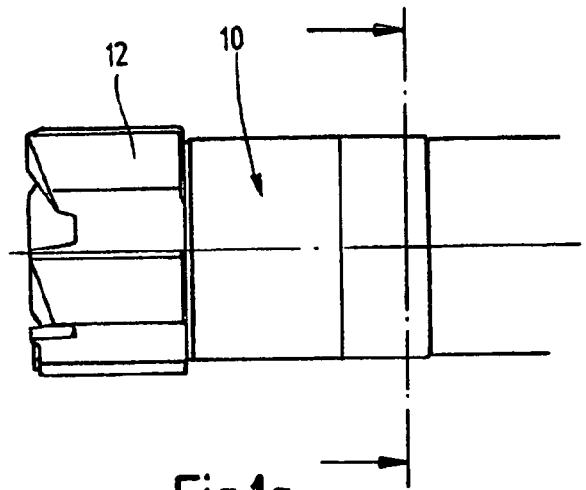
Figure 1B:
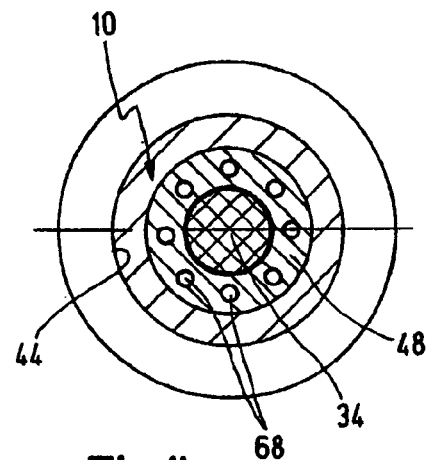
Figure 1C:
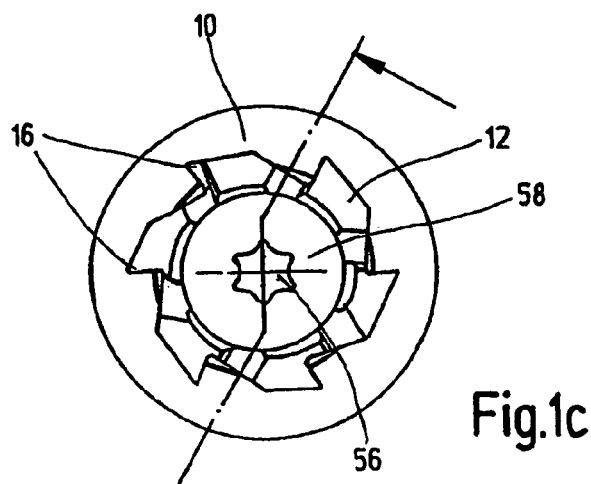
Figure 1D:
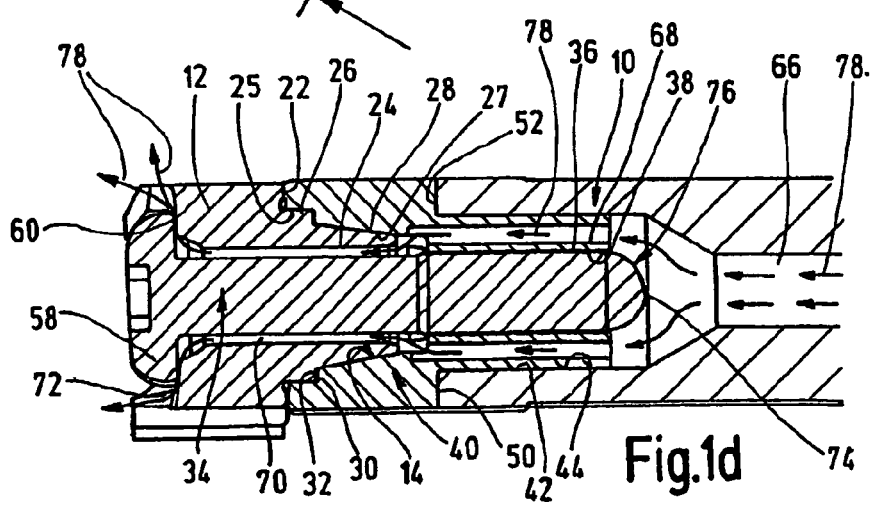
Figure 2A:
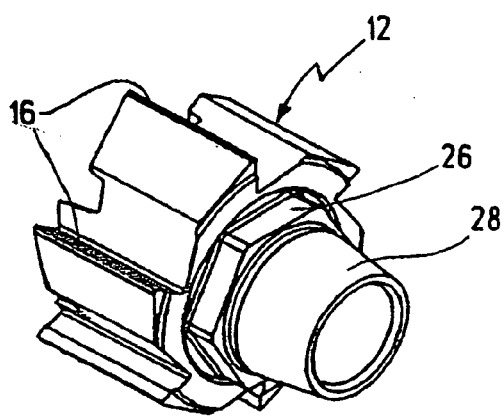
Figure 2B:
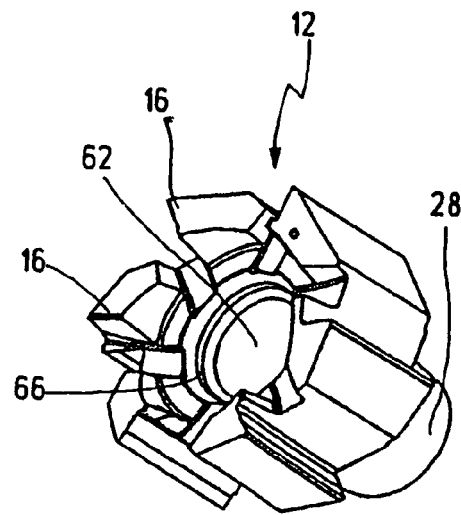
Figure 2C:
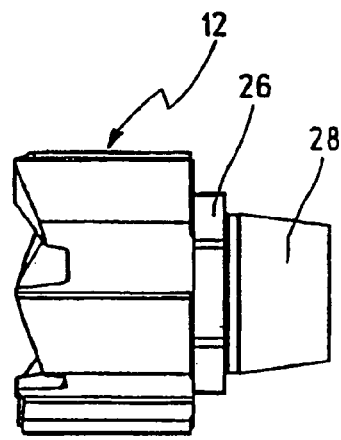
Figure 2D:
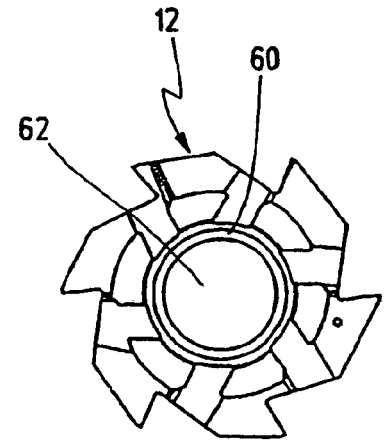
Figure 5A:
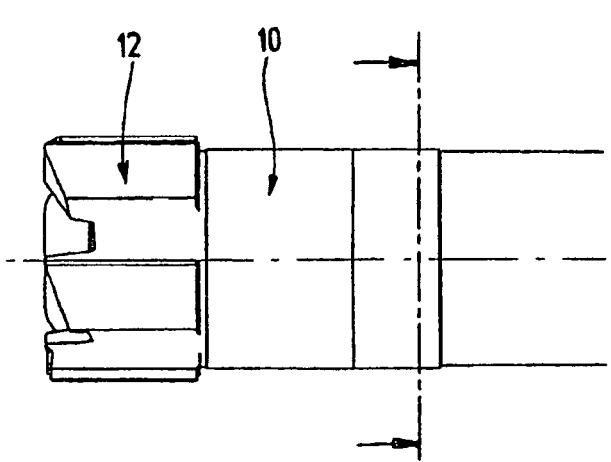
Figure 5B:
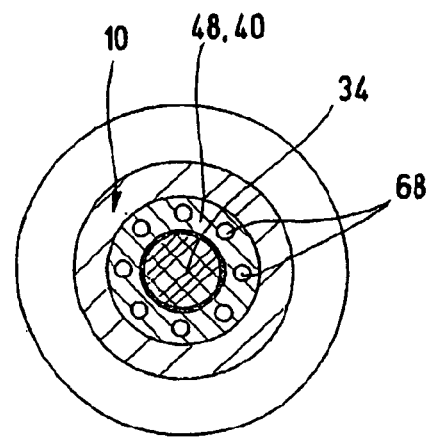
Figure 5C:
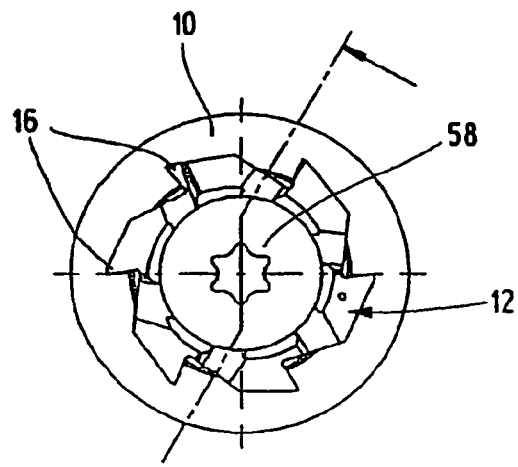
Figure 5D:
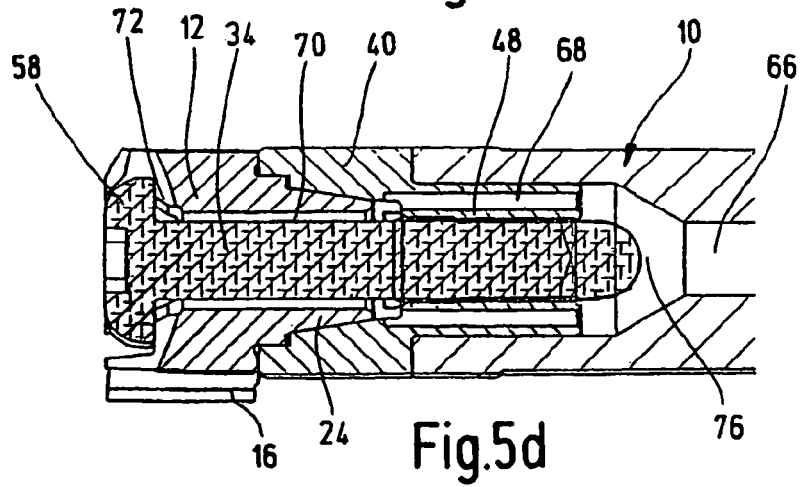

| | | | | |
|---|---|---|---|---|
| 1,461,462 A | * | 7/1923 | Smith et al. | 408/201 |
| 1,571,260 A | * | 2/1926 | Gairing | 408/201 |
| 2,237,901 A | * | 4/1941 | Chun | 408/59 |
| 2,383,688 A | | 8/1945 | Seiter | |
| 2,867,140 A | * | 1/1959 | Getts | 408/57 |
| 3,320,833 A | | 5/1967 | Andreasson | |
| 5,238,335 A | * | 8/1993 | Nomura | 408/59 |
| 5,607,263 A | | 3/1997 | Nespeta et al. | |
| 6,450,738 B1 | * | 9/2002 | Ripley | 407/35 |
| 6,896,450 B2 | * | 5/2005 | Rothenstein | 408/59 |
| 6,902,355 B2 | | 6/2005 | Kress et al. | |
| 7,004,692 B2 | * | 2/2006 | Hecht | 408/233 |
| 7,775,751 B2 | * | 8/2010 | Hecht et al. | 408/57 |
| 2002/0067965 A1 | | 6/2002 | Kress et al. | |
| 2003/0143044 A1 | | 7/2003 | Rothenstein | |
| 2005/0220551 A1 | | 10/2005 | Buettiker et al. | |

FOREIGN PATENT DOCUMENTS

| | | |
|---|---|---|
| DE | 43 30 826 A1 | 10/1994 |
| DE | 299 19 851 U1 | 3/2000 |
| DE | 102 24 228 A1 | 8/2003 |
| DE | 203 06 151 U1 | 7/2004 |
| EP | 1 193 011 A1 | 4/2002 |
| JP | 2004276136 A * | 10/2004 |
| WO | WO 01/64381 A2 | 9/2001 |
| WO | WO 02076661 A1 * | 10/2002 |
| WO | WO 03/051564 A1 | 6/2003 |

* cited by examiner

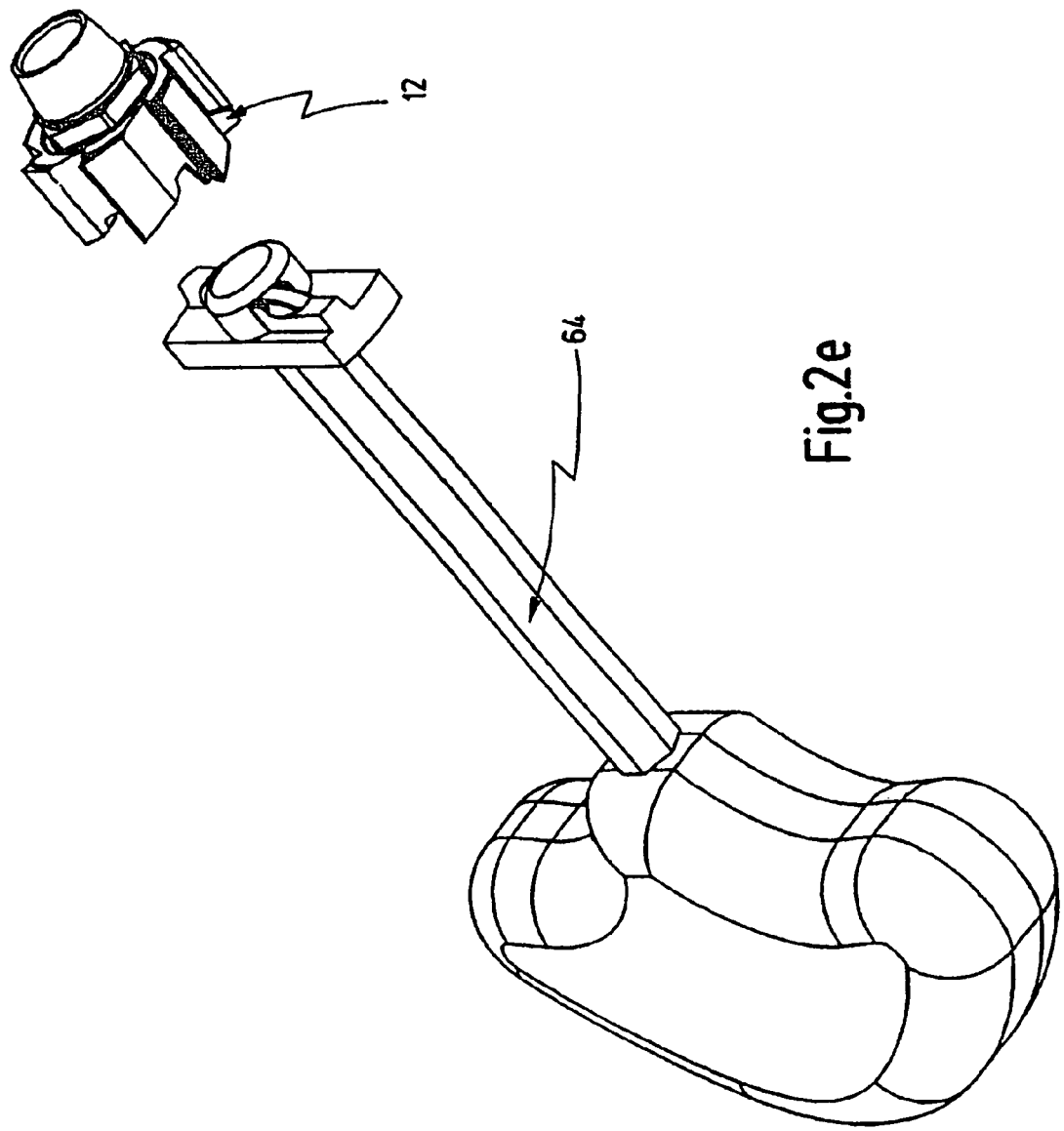

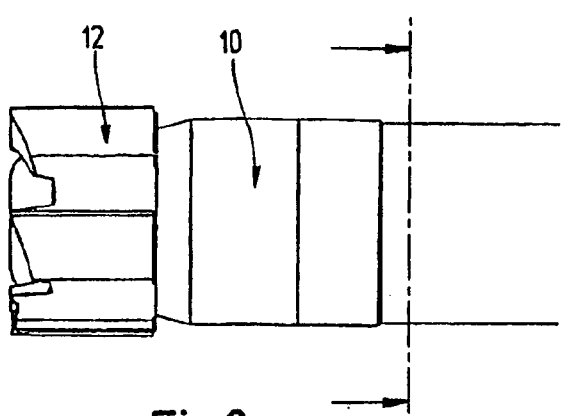
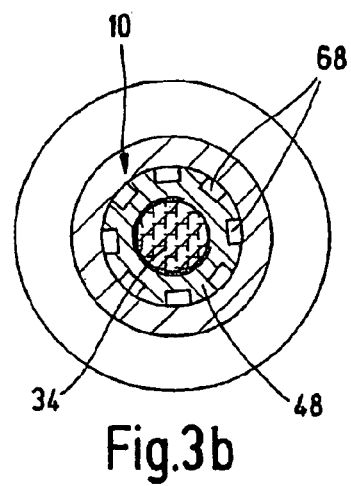
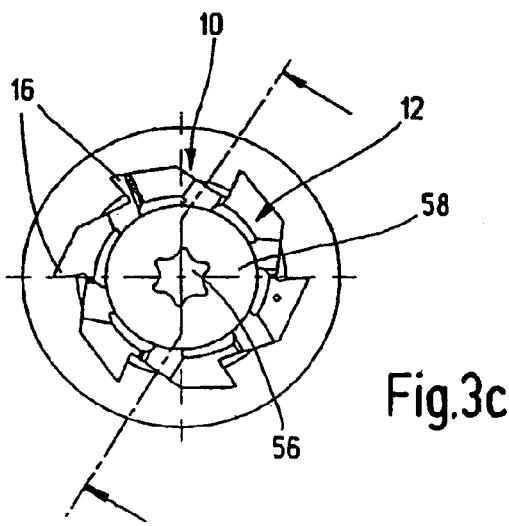
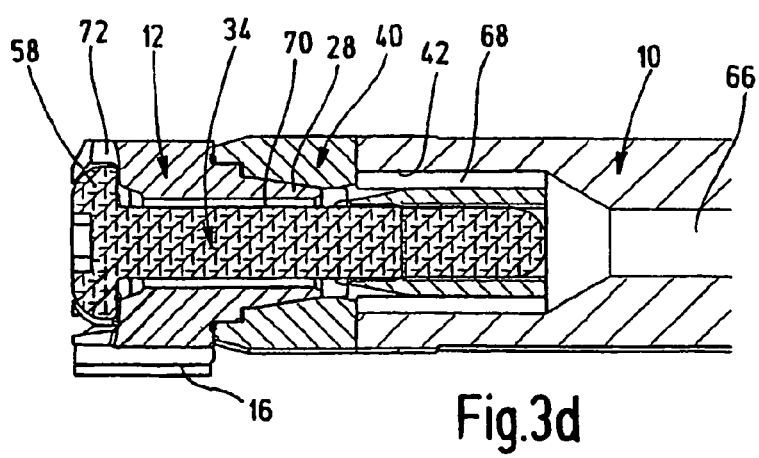

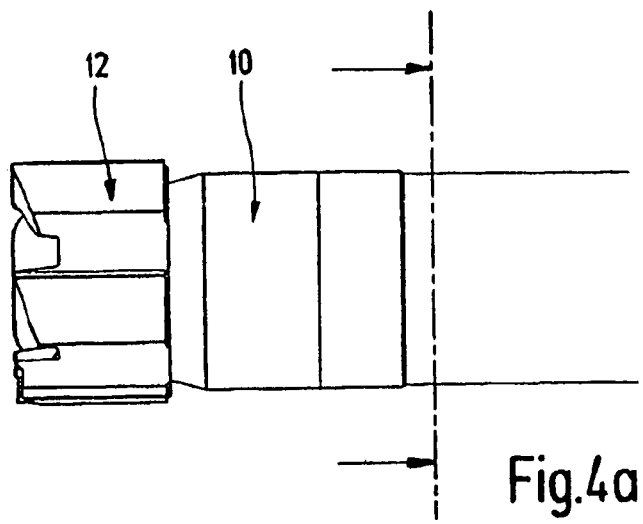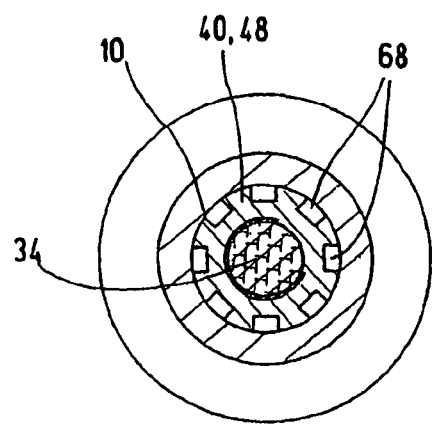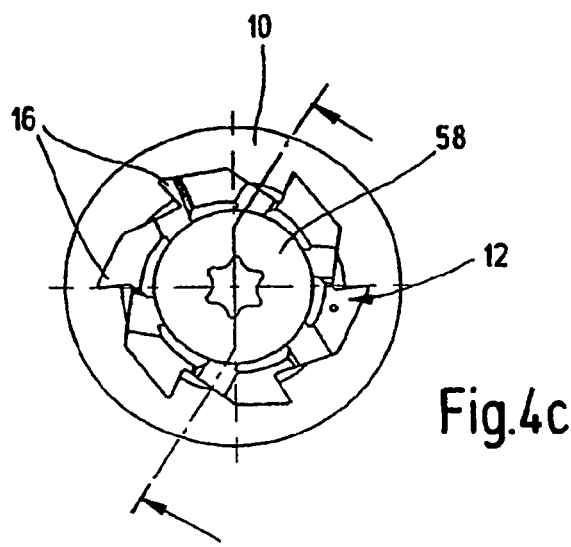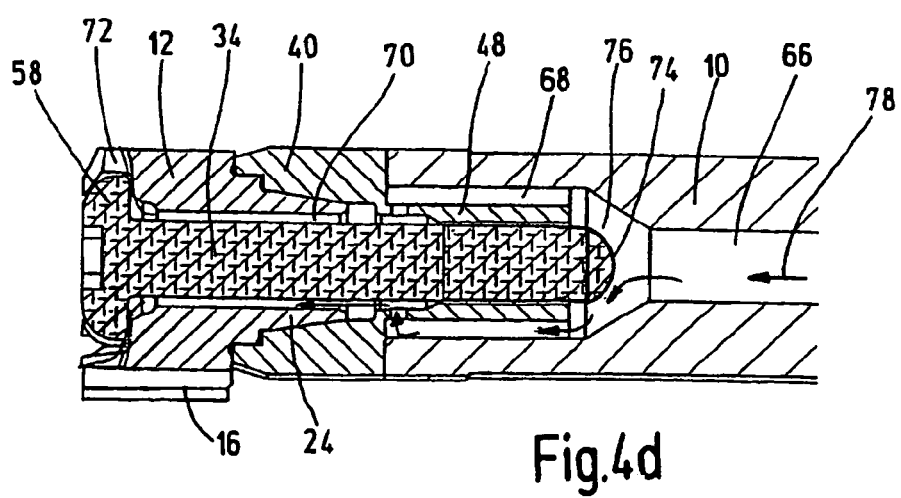

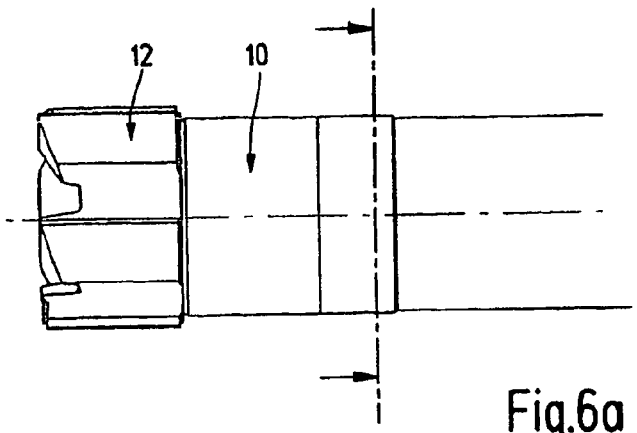
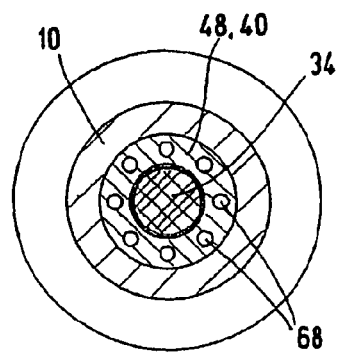
Fig.6a  Fig.6b
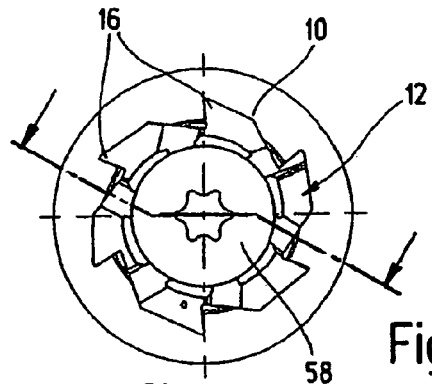
Fig.6c
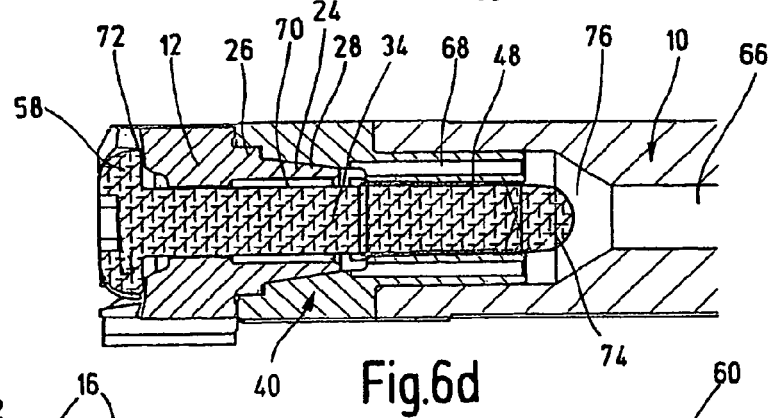
Fig.6d
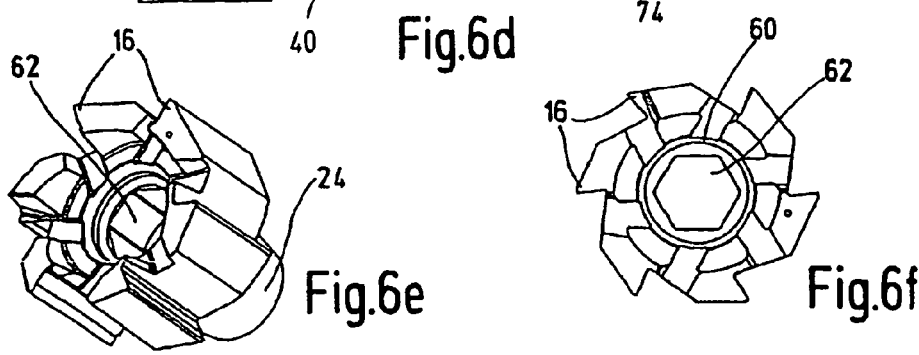
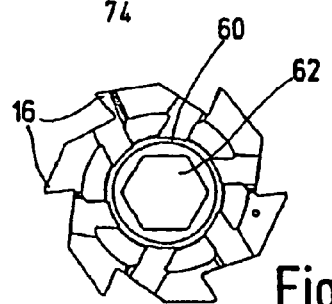
Fig.6e  Fig.6f

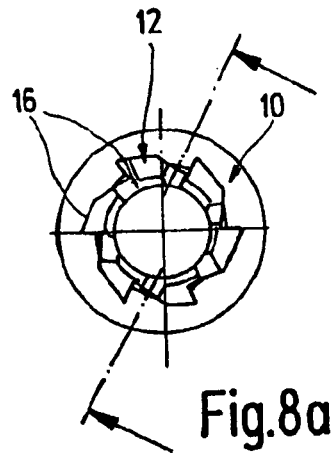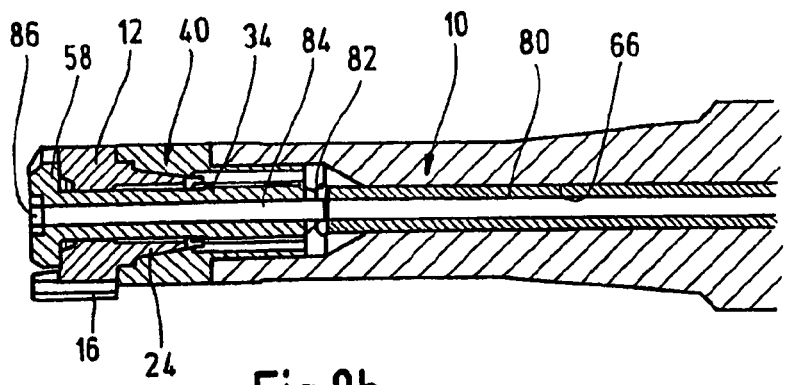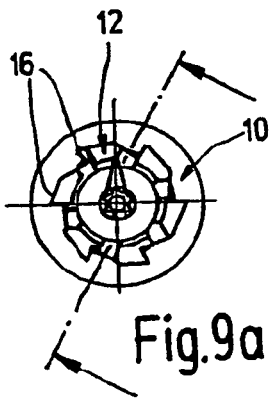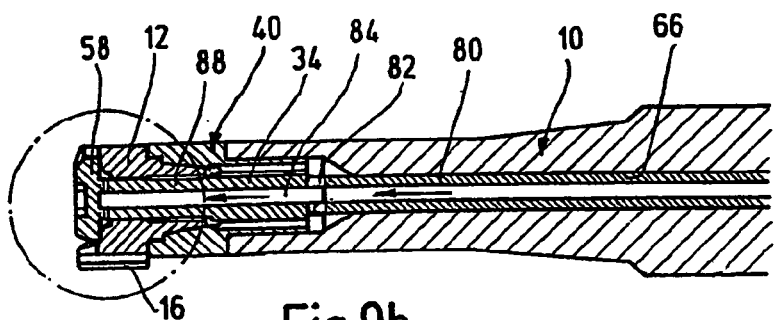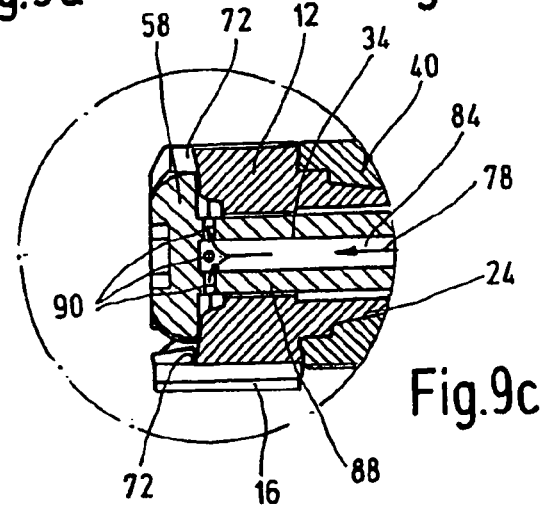

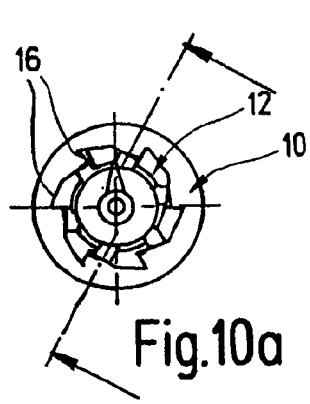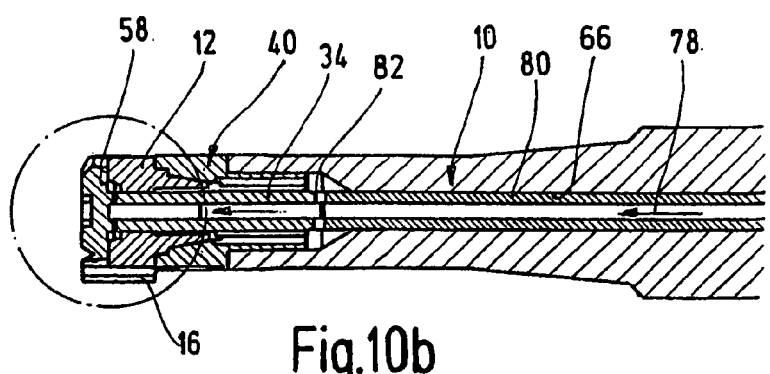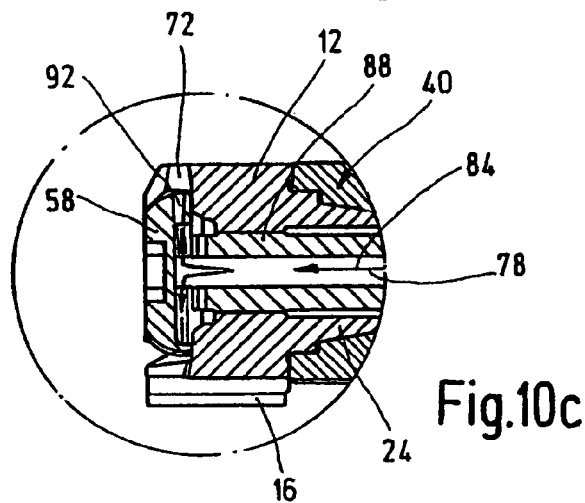

MACHINE TOOL

The invention relates to a machine tool, in particular a machine reamer, having a shank-like basic body and an interchangeable cutting head which projects beyond the basic body at the front end, engages by means of an axially projecting extension in a front-end receptacle fixed in relation to the basic body and is releasably clamped in place there by means of a clamping screw passing axially centrally through the interchangeable cutting head, the clamping screw having a screw head which bears against an end face of the interchangeable cutting head.

Machine tools of this type designed as machine reamers are used for the precision machining of cylindrical bores with the aim of achieving high dimensional and geometrical accuracy. An important property of a machine reamer is the coaxiality of the interchangeable cutting head, designed as reaming head, with respect to the axis of rotation. In a known machine reamer (WO 01/64381), the interchangeable cutting head, which can be clamped in place with a tapered extension in a complementary front-end receptacle of the basic body by means of a drawbar, provides for the requisite coaxiality. However, it has been found that, in particular in the case of small overall sizes, rotary driving via a tapered extension is not readily ensured. In order to avoid this disadvantage, it has already been proposed (DE-102 24 228 A1) for the drawbar to have a complementary polygonal portion passing through an axially central polygonal opening of the interchangeable cutting head. This means that the drawbar can be exactly positioned with respect to the reaming head in the circumferential direction and good rotary driving is ensured. However, it is felt to be disadvantageous that the drawbar fixed in its rotary position cannot be screwed into the basic body solely from the front end. On the contrary, a draw nut to be screwed in from the rear side of the basic body and to be connected to the drawbar is required for this purpose.

Based thereon, the object of the invention is to improve the known machine tool of the type mentioned at the beginning to the effect that the fitting of the interchangeable cutting head on the basic body is facilitated and good rotary driving is nonetheless ensured.

The combination of features specified in patent claim 1 is proposed in order to achieve this object. Advantageous configurations and developments of the invention follow from the dependent claims.

The solution according to the invention consists in particular in the fact that the extension of the interchangeable cutting head has a polygonal portion passing through an axially central polygonal opening, fixed in relation to the basic body, and complementary to said polygonal opening, and that the clamping screw is screwed into a central internal thread fixed in relation to the basic body.

To improve the centering, it has proved to be advantageous if the extension has an externally tapered portion which adjoins the polygonal portion, engages in a tapered opening, fixed in relation to the basic body, and is complementary thereto, the externally tapered portion being separated from the polygonal portion via an annular step, and the tapered opening being separated from the polygonal opening via an annular step complementary to said annular step.

A preferred configuration of the invention provides for the basic body to have a functional insert containing a front-end receptacle for the interchangeable cutting head and also the internal thread, the polygonal opening and/or the tapered opening. In this case, the functional insert is rigidly connected to the basic body, preferably shrunk in place or screwed into its receptacle. The functional insert can also be connected to the basic body in an integral manner, preferably brazed, welded or adhesively bonded in place in its receptacle. The basic body preferably has an axially central mating hole for a mating pin projecting axially centrally on the functional insert beyond an annular shoulder. Alternatively, the basic body can also have an axially central tapped hole for a threaded pin projecting axially centrally on the functional insert beyond the annular shoulder. In addition, it is advantageous if the functional insert bears with its annular shoulder against a front-end annular surface, defining the receptacle, of the basic body.

A further preferred configuration of the invention provides for the internal thread for the clamping screw to be arranged inside the mating or threaded pin in the functional insert, whereas the polygonal opening and/or the tapered opening are/is arranged axially outside the mating or threaded pin. For the purpose of exact positioning, the functional insert expediently has a front-end annular surface, against which a complementary annular shoulder of the clamped interchangeable cutting head abuts.

A further advantageous configuration of the invention provides for the basic body to have a preferably axially central coolant bore, for the functional insert, in the region of the mating pin, to define coolant passages which are arranged outside the internal thread and communicate with the coolant bore on the basic body side, for coolant passages defined by the interchangeable cutting head and/or the clamping screw to be arranged in the region of that part of the interchangeable cutting head which engages in the functional insert, said coolant passages communicating with the coolant passages on the mating pin side, and for the coolant passages on the interchangeable cutting head side, in the region of the screw head, to open into outlet openings pointing toward the cutting edges of the interchangeable cutting head. This enables the bore wall to be wetted in advance of the cutting and ensures sufficient lubrication of the tool even at maximum cutting speeds. In addition, if the coolant bore and the coolant passages have in their continuation an essentially constant opening cross section, the preconditions for minimum quantity lubrication, in which an oil/air mixture is used as cooling lubricant, have been met. A further improvement in this respect is achieved by virtue of the fact that the preferably rounded point of the clamping screw engages, in such a way as to reduce the cross section, in a widening transition opening between the coolant bore on the basic body side and the coolant passages on the mating pin side.

The coolant passages on the mating pin side are advantageously designed as bores passing through the mating pin in an axially parallel manner. Alternatively, the coolant passages on the mating pin side can also be designed as axial grooves, defined on one side by the mating hole wall, in the mating pin wall.

A further preferred configuration of the invention provides for the basic body to have an axially central coolant bore, and for the clamping screw to have a central passage which communicates with the coolant bore and opens in the region of the screw head into at least one outlet opening. The outlet opening is arranged in the screw head, for example in an axially central manner. A preferred configuration of the invention provides for a plurality of outlet openings to be provided which communicate with the central passage via radial passages. The radial passages in this case can pass through the shank of the clamping screw or through the screw head. They expediently point toward the cutting edges of the interchangeable cutting head.

The coolant bore of the basic body advantageously contains a coolant tube which communicates with the central passage of the clamping screw and is subsequently inserted into the coolant bore of the basic body. In order to ensure tight transfer of coolant, the clamping screw, with its central passage, expediently adjoins the coolant bore or the coolant tube via a sealing ring.

Figure 7A:
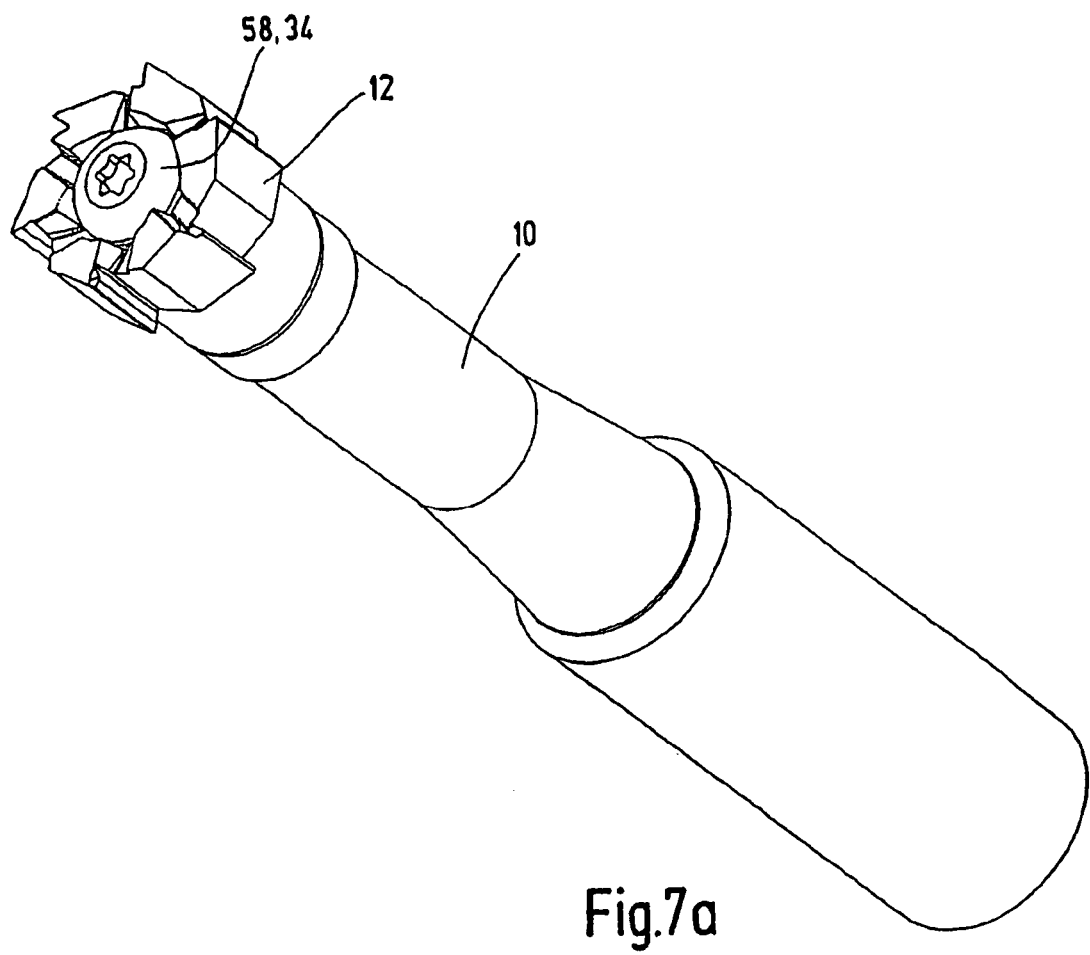

The invention is explained in more detail below with reference to the exemplary embodiments shown schematically in the drawing, in which:

FIGS. 1a to d show a first embodiment variant of a machine reamer in a truncated side view, a cross section, a plan view and a truncated longitudinal section;

FIGS. 2a to d show the interchangeable cutting head of the embodiment variants 1 to 3 in two diagrammatic illustrations, a side view and a plan view;

FIG. 2e shows a tool for fitting and removing the interchangeable cutting head, in a diagrammatic illustration;

FIGS. 3a to d show a second embodiment variant of a machine reamer in illustrations corresponding to FIGS. 1a to d;

FIGS. 4a to d show a third embodiment variant of a machine reamer in illustrations corresponding to FIGS. 1a to d;

FIGS. 5a to d show a fourth embodiment variant of a machine reamer in illustrations corresponding to FIGS. 1a to d;

FIGS. 6a to d show a fifth embodiment variant of a machine reamer in illustrations corresponding to FIGS. 1a to d;

FIGS. 6e and f show the interchangeable cutting head of the machine reamer according to FIGS. 6a to d, in a diagrammatic illustration and in plan view;

FIGS. 7a and b show a sixth embodiment variant of a machine reamer in a diagrammatic illustration and in longitudinal section;

FIGS. 8a and b show a seventh embodiment of a machine reamer in a plan view and in a longitudinal section;

FIGS. 9a to c show an eighth embodiment variant of a machine reamer in a plan view, a longitudinal section and an enlarged detail from FIG. 9b;

FIGS. 10a to c show a ninth embodiment variant of a machine reamer in a plan view, a longitudinal section and an enlarged detail from FIG. 10b.

The machine tools shown in the drawing are designed as machine reamers. They have a basic body 10 designed as a shank and an interchangeable cutting head 12 which projects axially at the front end beyond the basic body, is designed as a reaming head and is made, for example, of hardened steel, carbide, ceramic or diamond-coated cutting material. The interchangeable cutting head can be clamped free of play and in a coaxially self-centering manner under axial prestress in a front-end receptacle fixed in relation to the basic body. It has a plurality of cutting teeth 16 arranged at a distance from one another in the circumferential direction. In addition, it has an extension 24 which projects axially beyond a flat face 22 and which has a polygonal portion 26, passing through an axially central polygonal opening 25, fixed in relation to the basic body, and complementary to said polygonal opening 25, and an externally tapered portion 28 which adjoins the polygonal portion 26, engages in a tapered opening 27, fixed in relation to the basic body, and is complementary thereto. The externally tapered portion 28 is separated from the polygonal portion 26 via an annular step 30, whereas the tapered opening 27 is separated from the polygonal opening 25 via an annular step 32 complementary to said annular step 30. With the polygonal part 26 and the externally tapered portion 28 of its extension 24, the interchangeable cutting head 12 is anchored in the polygonal opening 25 and the tapered opening 27 of the receptacle 14 in a rotationally locked manner and so as to be free of play.

The interchangeable cutting head 12 is clamped in place on the basic body 10 by means of a clamping screw 34 which passes axially centrally through the interchangeable cutting head 12 and is screwed with its external thread 36 into an internal thread 38 fixed in relation to the basic body.

In the sixth embodiment variant according to FIGS. 7a and b, the internal thread 38 and the receptacle 14 with polygonal opening 25 and tapered opening 27 are located directly in the basic body 10.

In the embodiment variants according to FIGS. 1, 3, 4, 5, 6 and 8 to 10, the basic body 10 has a functional insert 40 which is inserted into a front-end receptacle 42 of the basic body and is rigidly connected to the basic body 10 via said receptacle 42. For this purpose, the functional insert 40 can be shrunk in place in or screwed into the receptacle 42 of the basic body 10. It can also be connected to the basic body in an integral manner, for example brazed, welded or adhesively bonded in place in its front-end receptacle 42. In the exemplary embodiments shown, the centering is effected via a mating hole 44 which is arranged axially centrally in the basic body 44 and in which a mating pin 48 projecting axially centrally beyond the annular shoulder 46 engages. In the fitted state, the functional insert 40 bears with its annular shoulder 46 against a front-end annular surface 50, defining the receptacle, of the basic body 10. In the embodiment variants 1 to 5, the internal thread 38 for the clamping screw 34 is located inside the mating pin 48, whereas the polygonal opening 25 and the tapered opening 27 are arranged axially outside the mating pin 48. Furthermore, the functional insert 40 has a front-end annular surface 52, against which the clamped interchangeable cutting head 12 with a complementary annular flat face 22 abuts.

The interchangeable cutting head 12 is restrained together with the basic body 10 and its functional insert 40 via a central clamping screw 34 engaging in the internal thread 38. The clamping screw 34 is screwed in using a screwdriving tool which engages in a polygonal opening 56 of the screw head 58. In the clamped state, the screw head 58 bears against an annular end face 60 of the interchangeable cutting head 12, while the interchangeable cutting head 12, at its annular shoulder 22 designed as a flat face, is pressed against the annular surface 52 of the functional insert 40 or of the basic body 10.

When exchanging the interchangeable cutting head 12, first of all the clamping screw 24 is unscrewed from the internal thread 38 and removed. A tool 64 adapted to the opening contour is then inserted into the front-end opening 62 of the interchangeable cutting head 12, by means of which tool 64 the interchangeable cutting head 12 can be removed from its clamped connection in the receptacle 14 of the functional insert 40 or of the basic body 10 (FIGS. 7a, b).

For the coolant supply of the cutting teeth 16 of the interchangeable cutting head 12, the basic body 10 has an axially central coolant bore 66. In continuation, coolant passages 68 which communicate with the coolant bore 66 on the basic body side are located outside the internal thread 38. In the sixth embodiment variant according to FIGS. 7a and b, the coolant passages 68 are located in the basic body, whereas in the case of the embodiment variants 1 to 5 they are arranged in the functional insert 40 in the region of the mating pin 48. In continuation, the coolant passages 68 communicate with coolant passages 70 which are defined by the interchangeable cutting head 12 and/or the clamping screw 34, in the region of that part of the interchangeable cutting head 12 which engages in the receptacle 14, and open in the region of the screw head 58 into outlet openings 72 pointing toward the cutting teeth 16 of the interchangeable cutting head 12. The coolant bores 66 and the coolant passages 68, 70 are dimensioned in such a way that they have in their continuation an essentially constant opening cross section. In order to achieve this, the clamping screw 34 in all the embodiments has a rounded point 74, with which it engages, in such a way as to reduce the cross section, in a widened transition opening 76 between the coolant bore 66 fixed in relation to the basic body and the coolant passages 68. With these measures, sufficient lubrication of the tool is always ensured even at maximum cutting speeds. This is especially important in the case of minimum quantity lubrication, in which an oil/air mixture is used as cooling lubricant.

In the embodiments 1, 4 and 5, the coolant passages 68 on the mating pin side are designed as bores passing through the mating pin 48 in an axially parallel manner (cf. FIGS. 1b, 5b and 6b), whereas in the case of the embodiment variants 2 and 3 they are designed as axial grooves, defined on one side by the mating hole wall, in the mating pin wall (cf. FIGS. 3b and 4b). In the sixth embodiment variant according to FIG. 7b, the coolant passages 68 are located in the form of bores directly in the basic body 10.

In the embodiment variants 1 to 4 according to FIGS. 1, 3, 4 and 5, a cylindrical bore for the clamping screw 34 to pass through, which has an undersize in the shank region, is provided in the interchangeable cutting head 12 and defines together with the clamping screw shank an annular passage 70.

Figure 7B:
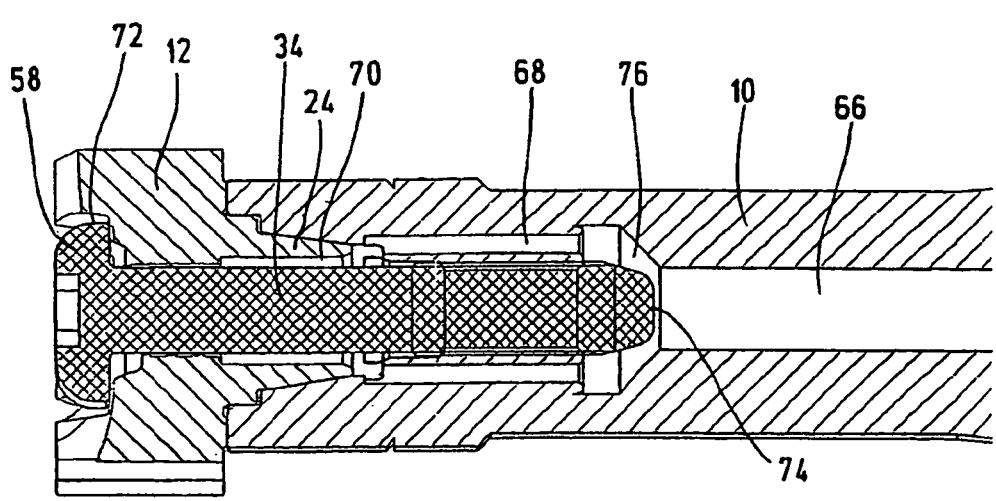

Located in the interchangeable cutting head 12 in the embodiment variants 5 and 6 according to FIGS. 6a to d and 7a and 7b is a hexagonal opening (cf. FIGS. 6e and f), through which the shank of the clamping screw 34 passes (cf. FIGS. 6d and 7b). Here, too, a through-opening for the passage of coolant to the screw head and to the outlet openings 72 remains in the hexagon corners.

In the embodiment variants 7 to 9 according to FIGS. 8, 9 and 10, the coolant bore 66 on the basic body side is fitted with a coolant tube 80, which is attached at its inner front end to a central passage 84 of the clamping screw 34 via a sealing ring 82 and communicates with said central passage 84. In this case, the cross section of flow of the coolant tube 80 and of the central passage 84 are the same size, such that a smooth transition is ensured. This is important in particular for the minimum quantity lubrication.

In the case of the exemplary embodiment according to FIGS. 8a and b, the central passage 84 opens into an outlet opening 86 passing axially centrally through the screw head 58.

The embodiment variants according to FIGS. 9 and 10 differ from the embodiment variant according to FIG. 8 in that the outlet openings 72 there are directed essentially radially outward and point toward the cutting teeth 16 of the interchangeable cutting head 12. The outlet openings 72 communicate with the central passage 84 via radial passages 90 in the shank 88 of the clamping screw 34 in the case of the embodiment variant according to FIGS. 9a to c and via radial passages 92 in the screw head 58 in the case of FIGS. 10a to c.

In summary, the following should be noted: the invention relates to a machine tool, in particular a machine reamer. The machine tool has a shank-like basic body 10 and an interchangeable cutting head 12 which projects beyond the basic body 10 at the front end, engages by means of an axially projecting extension 24 in a front-end receptacle 14 fixed in relation to the basic body and is releasably clamped in place there by means of a clamping screw 34 passing axially centrally through the interchangeable cutting head 12. In this case, the clamping screw 34 bears with its screw head 58 against an end face 60 of the interchangeable cutting head 12. According to the invention, the extension 24 of the interchangeable cutting head 12 has a polygonal portion 26, passing through an axially central polygonal opening 25, fixed in relation to the basic body, and complementary to said polygonal opening 25, and an externally tapered portion 28 which adjoins the polygonal portion 26, engages in a tapered opening 27, fixed in relation to the basic body, and is complementary thereto, whereas the clamping screw 34 is screwed into a central internal thread 38 fixed in relation to the basic body. The basic body preferably has a functional insert 40 which contains the internal thread 38 and the polygonal opening 25 and/or the tapered opening 27 and is rigidly connected to the basic body 10.

The invention claimed is:

1. A machine tool having a shank-like basic body (10) and an interchangeable cutting head (12) which projects beyond the basic body at the front end, engages by means of an axially projecting extension (24) in a front-end receptacle (14) fixed in relation to the basic body and is releasably clamped in place there by means of a clamping screw (34) passing axially centrally through the interchangeable cutting head (12), the clamping screw (34) having a screw head (58) which bears against an end face (60) of the interchangeable cutting head (12) and being screwed into a central internal thread (38) fixed in relation to the basic body, and the extension (24) of the interchangeable cutting head (12) having a polygonal portion (26) passing through an axially central polygonal opening (25), fixed in relation to the basic body, and complementary to said polygonal opening (25), characterized in that the basic body (10) has a functional insert (40) containing the internal thread (38) and the polygonal opening (25) and/or the tapered opening (27), in that the basic body (10) has an axially central coolant bore (66), in that the functional insert (40), in the region of the mating or threaded pin (48), defines coolant passages (68) which are arranged outside the internal thread (38) and communicate with the coolant bore (66) on the basic body side, in that coolant passages (70) defined by the interchangeable cutting head (12) and/or the clamping screw (34) are arranged in the region of that part of the interchangeable cutting head (12) which engages in the functional insert (40), said coolant passages (70) communicating with the coolant passages (68) on the mating or threaded pin side, and in that the coolant passages (70) on the interchangeable cutting head side, in the region of the screw head (58), open into outlet openings (72) pointing toward the cutting edges (16) of the interchangeable cutting head (12).

2. The machine tool as claimed in claim 1, characterized in that the extension (24) has an externally tapered portion (28) which adjoins the polygonal portion (26), engages in a tapered opening (27), fixed in relation to the basic body, and is complementary thereto.

3. The machine tool as claimed in claim 2, characterized in that the externally tapered portion (28) is separated from the polygonal portion (26) via an annular step (30).

4. The machine tool as claimed in claim 3, characterized in that the tapered opening (27) is separated from the polygonal opening (25) via an annular step (32) complementary to said annular step (30).

5. The machine tool as claimed in claim 1, characterized in that the functional insert (40) is rigidly connected to the basic body (10), shrunk in place or screwed on in a receptacle (42) on the basic body side.

6. The machine tool as claimed in claim 1, characterized in that the functional insert (40) is connected to the basic body

(10) in an integral manner, brazed, welded or adhesively bonded in place in a receptacle (42) on the basic body side.

7. The machine tool as claimed in claim 1, characterized in that the basic body (10) has an axially central mating hole (44) for a mating pin (48) projecting axially centrally on the functional insert (40) beyond an annular shoulder (46).

8. The machine tool as claimed in claim 1, characterized in that the basic body (10) has an axially central tapped hole for a threaded pin projecting axially centrally on the functional insert (40) beyond the annular shoulder (46).

9. The machine tool as claimed in claim 7, characterized in that the functional insert (40) bears with its flat face (22) against a front-end annular surface (52), defining the receptacle (42), of the basic body (10).

10. The machine tool as claimed in claim 7, characterized in that the internal thread (38) is arranged inside the mating or threaded pin (48).

11. The machine tool as claimed in claim 7, characterized in that the polygonal opening (25) and/or the tapered opening (27) are/is arranged axially outside the mating or threaded pin (48).

12. The machine tool as claimed in claim 1, characterized in that the functional insert (40) has a front-end annular surface (52), against which a complementary flat face (22) of the clamped interchangeable cutting head (12) abuts.

13. The machine tool as claimed in claim 1, characterized in that the coolant bore (66) and the coolant passages (68, 70) have in their continuation an essentially constant opening cross section.

14. The machine tool as claimed in claim 1, characterized in that the preferably rounded point (74) of the clamping screw (34) engages, in such a way as to reduce the cross section, in a widening transition opening (76) between the coolant bore (66) on the basic body side and the coolant passages (68) on the mating pin side.

15. The machine tool as claimed in claim 1, characterized in that the coolant passages (68) on the mating or threaded pin side are designed as bores passing through the mating or threaded pin in an axially parallel manner.

16. The machine tool as claimed in claim 1, characterized in that the coolant passages (68) on the mating pin side are designed as axial grooves, defined on one side by the mating hole wall, in the mating pin wall.

17. A machine tool having a shank-like basic body (10) and an interchangeable cutting head (12) which projects beyond the basic body at the front end, engages by means of an axially projecting extension (24) in a front-end receptacle (14) fixed in relation to the basic body and is releasably clamped in place there by means of a clamping screw (34) passing axially centrally through the interchangeable cutting head (12), the clamping screw (34) having a screw head (58) which bears against an end face (60) of the interchangeable cutting head (12) and being screwed into a central internal thread (38) fixed in relation to the basic body, and the extension (24) of the interchangeable cutting head (12) having a polygonal portion (26) passing through an axially central polygonal opening (25), fixed in relation to the basic body, and complementary to said polygonal opening (25), characterized in that the basic body (10) has a functional insert (40) containing the internal thread (38) and the polygonal opening (25) and/or the tapered opening (27), in that the basic body (10) has an axially central coolant bore (66), and in that the clamping screw (34) has a central passage (84) which communicates with the coolant bore (66) or with a coolant tube (80) arranged in the coolant bore and opens in the region of the screw head into at least one outlet opening (72, 86).

18. The machine tool as claimed in claim 17, characterized in that the outlet opening (86) is arranged in the screw head in an axially central manner.

19. The machine tool as claimed in claim 17, characterized in that the outlet openings (72) communicate with the central passage (84) via radial passages (90, 92).

20. The machine tool as claimed in claim 19, characterized in that the radial passages (90) pass through the shank (88) of the clamping screw (34).

21. The machine tool as claimed in claim 19, characterized in that the radial passages (92) pass through the screw head (58).

22. The machine tool as claimed in claim 17, characterized in that the at least one outlet opening (86, 72) points toward the cutting edges (16) of the interchangeable cutting head (12).

23. The machine tool as claimed in claim 17, characterized in that the coolant bore (66) of the basic body (10) is fitted with a coolant tube (80) communicating with the central passage (86) of the clamping screw (34).

24. The machine tool as claimed in claim 17, characterized in that the clamping screw (34), with its central passage (84), adjoins the coolant bore (66) or the coolant tube (80) via a sealing ring (82).

\* \* \* \* \*